US010454346B2

(12) United States Patent
Ogawa et al.

(10) Patent No.: US 10,454,346 B2
(45) Date of Patent: Oct. 22, 2019

(54) ENCODER, CONTROLLER, METHOD FOR PROCESSING DATA (71) Applicant: KABUSHIKI KAISHA YASKAWA DENKI, Kitakyushu-shi (JP)

(72) Inventors: Kunihiko Ogawa, Kitakyushu (JP); Keita Ogoh, Kitakyushu (JP); Yasuhiro Matsutani, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 749 days.

(21) Appl. No.: 15/159,817

(22) Filed: May 20, 2016

(65) Prior Publication Data

US 2016/0344267 A1 Nov. 24, 2016

(30) Foreign Application Priority Data

May 22, 2015 (JP) .................................. 2015-104866

(51) Int. Cl.
*H02K 11/215* (2016.01)
*H02K 11/22* (2016.01)
*H02K 11/35* (2016.01)

(52) U.S. Cl.
CPC ........... *H02K 11/215* (2016.01); *H02K 11/22* (2016.01); *H02K 11/35* (2016.01)

(58) Field of Classification Search
CPC ........ B25J 13/08; B25J 13/085; B25J 9/1633; B25J 13/088; B25J 9/1664; B25J 9/1697; B25J 11/008; B25J 13/00; B25J 13/003; B25J 13/006; B25J 13/02; B25J 13/025; B25J 13/06; B25J 13/065; B25J 13/084; B25J 13/087; B25J 18/00; B25J 19/023; B25J 19/028; B25J 19/04; B25J 3/00; B25J 3/04; B25J 9/0081; B25J 9/0084;

(Continued)

(56) References Cited

U.S. PATENT DOCUMENTS

| 9,427,872 B1* | 8/2016 | Bingham | B25J 9/1692 |
| 2003/0223374 A1 | 12/2003 | Hayashi | |
| 2006/0065816 A1* | 3/2006 | Johns | G06F 3/0312 |
| | | | 250/221 |
| 2010/0164423 A1 | 7/2010 | Nakayama et al. | |
| 2011/0202308 A1 | 8/2011 | Kishida et al. | |
| 2013/0144553 A1* | 6/2013 | Omata | G01D 5/245 |
| | | | 702/151 |

(Continued)

FOREIGN PATENT DOCUMENTS

JP 08-029201 2/1996
JP 3370845 B2 11/1997

(Continued)

OTHER PUBLICATIONS

Japanese Office Action for corresponding JP Application No. 2015-104866, dated Dec. 12, 2017 (w/ machine translation).

*Primary Examiner* — Bickey Dhakal
*Assistant Examiner* — Zoheb S Imtiaz
(74) *Attorney, Agent, or Firm* — Mori & Ward, LLP (57) ABSTRACT An encoder includes a first disc and a second disc, a first detector, a second detector, a rotation count detector, and a sender. The first disc and the second disc are mounted on a rotation shaft of a motor. The first detector is configured to detect a rotation position of the first disc within one rotation of the first disc. The second detector is configured to detect that the second disc has made one rotation. The rotation count detector is configured to count a rotation count of the second disc based on an output from the second detector. The sender is configured to send sending data including the rotation position and the rotation count.

11 Claims, 6 Drawing Sheets (58) Field of Classification Search
CPC . B25J 9/0087; B25J 9/06; B25J 9/1602; B25J 9/161; B25J 9/1612; B25J 9/1628; B25J 9/163; B25J 9/1646; B25J 9/1653; B25J 9/1669; B25J 9/1674; B25J 9/1682; B25J 9/1689; B25J 11/005; B25J 9/046; B25J 9/126; B25J 9/1676; B25J 9/1694; B25J 11/0055; B25J 11/009; B25J 13/089; B25J 15/0014; B25J 15/08; B25J 17/00; B25J 17/02; B25J 19/0004; B25J 19/0008; B25J 19/0041; B25J 19/0095; B25J 19/022; B25J 19/068; B25J 9/0027; B25J 9/02; B25J 9/042; B25J 9/08; B25J 9/1641; B25J 9/1679; G01D 5/3473; G01D 5/34707; G01D 5/24461
See application file for complete search history.

(56) References Cited

U.S. PATENT DOCUMENTS

| | | | | |
|---|---|---|---|---|
| 2015/0142377 | A1* | 5/2015 | Kishida | G01B 7/30 |
| | | | | 702/151 |
| 2016/0131508 | A1* | 5/2016 | Nagata | G01D 5/24461 |
| | | | | 250/231.14 |

FOREIGN PATENT DOCUMENTS

| | | |
|---|---|---|
| JP | 2003-346273 | 12/2003 |
| JP | 5104523 B2 | 11/2009 |
| JP | 2010-152595 | 7/2010 |
| JP | 2012-225674 | 11/2012 |
| JP | 2013-047694 | 3/2013 |

* cited by examiner

ENCODER, CONTROLLER, METHOD FOR PROCESSING DATA

CROSS-REFERENCE TO RELATED APPLICATIONS

The present application claims priority under 35 U.S.C. § 119 to Japanese Patent Application No. 2015-104866, filed May 22, 2015. The contents of this application are incorporated herein by reference in their entirety.

BACKGROUND

Field of the Invention

The embodiments disclosed herein relate to an encoder, a controller, and a method for processing data.

Discussion of the Background

Japanese Unexamined Patent Application Publication No. 2010-152595 discloses a motor control system that includes an encoder-equipped motor and an additional encoder mounted on the encoder-equipped motor. Based on outputs from the two encoders, the motor control system monitors the motor by checking whether there is an abnormality in the motor. Japanese Unexamined Patent Application Publication No. 2003-346273 discloses an encoder that includes a plurality of sensors mounted in the encoder. The encoder checks whether there is a contradiction between pieces of position information detected by the plurality of sensors. Then, the encoder adds the check result to data and sends the data to a controller or another device.

Japanese Patent No. 3370845 discloses an encoder that determines whether there is a data abnormality. When the encoder has determined that there is a data abnormality, the encoder sends an alarm to a controller in response to a request signal from the controller. Japanese Patent No. 5104523 discloses an encoder that includes a signal processing circuit that generates a first check code and a second check code. The first check code is used for cyclic redundancy check with respect to measurement information, and the second check code is used for overall check, with respect to the first check code and the measurement information. The encoder uses the first and second check codes to improve data reliability.

SUMMARY

According to one aspect of the present disclosure, an encoder includes a first disc and a second disc, a first detector, a second detector, a rotation count detector, and a sender. The first disc and the second disc are mounted on a rotation shaft of a motor. The first detector is configured to detect a rotation position of the first disc within one rotation of the first disc. The second detector is configured to detect that the second disc has made one rotation. The rotation count detector is configured to count a rotation count of the second disc based on an output from the second detector. The sender is configured to send sending data including the rotation position and the rotation count.

According to another aspect of the present disclosure, a controller includes a receiver, a first rotation count obtainer, a second rotation count obtainer, and a comparer. The receiver is configured to receive sending data from an encoder of a motor. The sending data includes a rotation position of a rotation shaft of the motor within one rotation of the rotation shaft; and a first rotation count of the rotation shaft. The first rotation count obtainer is configured to obtain a second rotation count of the rotation shaft based on a change in the rotation position of the rotation shaft within the one rotation of the rotation shaft. The second rotation count obtainer is configured to obtain the first rotation count included in the sending data. The comparer is configured to compare the second rotation count obtained by the first rotation count obtainer with the first rotation count obtained by the second rotation count obtainer.

According to the other aspect of the present disclosure, a method for processing data includes detecting, using a first sensor, a rotation position of a first disc within one rotation of the first disc, the first disc being mounted on a rotation shaft of a motor. That a second disc mounted on the rotation shaft has made one rotation is detected using a second sensor. A rotation count of the second disc is counted based on an output from the second detector. Data including the rotation position and the rotation count is sent.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings.

1. Embodiment

In order to improve the reliability of data from encoders that detect motor positions, one simple practice is to implement data duplication by using two encoders. According to the inventors' knowledge and experience, however, this practice increases the size and weight of the equipment, resulting in increases in cost. As a result of studies conducted by the inventors in an attempt to eliminate or minimize increases in the size and weight of the equipment and eliminate or minimize resulting increases in cost while implementing duplication of data from encoders, the inventors conceived of a novel and unique motor control system and related apparatuses, machines, devices, and methods. In the following description, the motor control system and related apparatuses, machines, devices, and methods will be detailed.

2. Physical Configuration of Motor Control System

Figure 1:
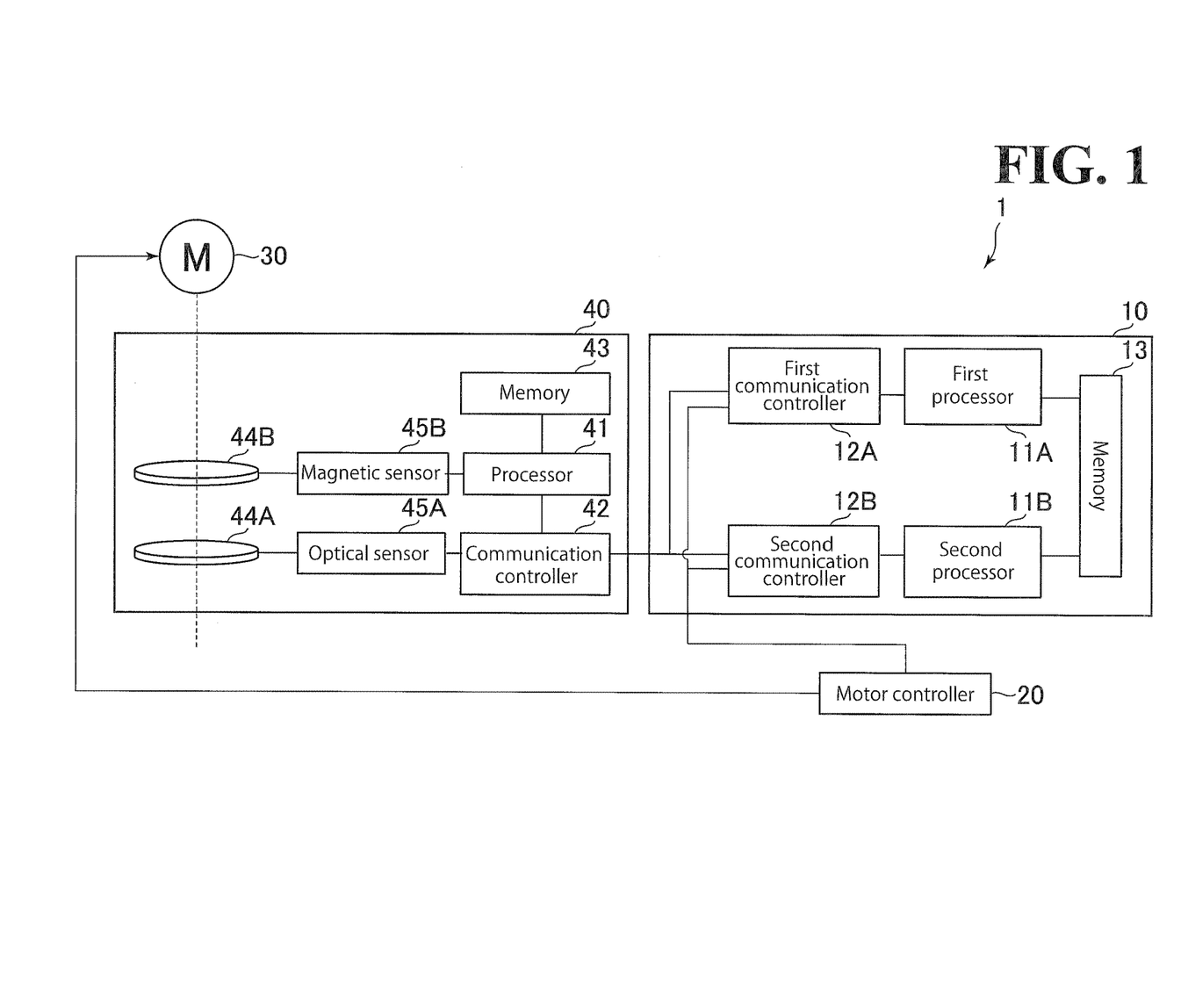
FIG. 1 is a block diagram illustrating a physical configuration of a motor control system according to an embodiment.

FIG. 1 is a block diagram illustrating a physical configuration of the motor control system according to this embodiment. As illustrated in FIG. 1, a motor control system 1 includes a controller 10, a motor controller 20, a motor 30, and an encoder 40. These elements are connected to each other through transmission paths.

The controller 10 is a computer that controls overall operation of the motor control system 1. For example, the controller 10 sends a command to the motor controller 20 and the encoder 40 at a predetermined timing, and receives data from the motor controller 20 and the encoder 40.

The controller 10 includes a first processor 11A, a second processor 11B, a first communication controller 12A, a second communication controller 12B, and a memory 13. Thus, the controller 10 according to this embodiment has two system combinations of processors and communication controllers.

The first processor 11A and the second processor 11B each may be any general-purpose integrated circuit such as a CPU and a micro-controller. The first processor 11A and the second processor 11B may include a working-purpose RAM (Random Access Memory), not illustrated.

The first communication controller 12A and the second communication controller 12B are common communication-purpose integrated circuits. For example, the first communication controller 12A and the second communication controller 12B each may be a dedicated integrated circuit such as an ASIC (Application Specific Integrated Circuit). The first communication controller 12A and the second communication controller 12B each include a connection port that serves as a communication interface through which to communicate with external devices.

The memory 13 is a common information storage medium. Specifically, the memory 13 is a nonvolatile memory such as a ROM (Read Only Memory), an EEPROM (Electrically Erasable Programmable Read Only Memory), a flash memory, and a hard disc. The memory 13 stores programs and various kinds of data.

The motor controller 20 is a computer that controls an amplifier to output current, voltage, and other parameters to the motor 30. The motor controller 20 is for controlling servo motors, and such motor controllers are generally referred to as servo controllers or servo amplifiers. The motor 30 according to this embodiment encompasses servo motors, and therefore, the motor controller 20 encompasses servo controllers. The motor controller 20 may include elements similar to the elements of the controller 10, namely, a processor, a communication controller, and a memory.

The encoder 40 is a sensor that detects the position of the motor 30. The encoder 40 may be an incremental encoder or an absolute encoder. The encoder 40 executes a command received from the controller 10 and sends to the controller 10 a result obtained by executing the command.

The encoder 40 includes a processor 41, a communication controller 42, a memory 43, an optical disc 44A, an optical sensor 45A, a magnetic disc 44B, and a magnetic sensor 45B. The processor 41, the communication controller 42, and the memory 43 of the encoder 40 may have physical configurations respectively similar to the physical configurations of the first processor 11A (or the second processor 11B), the first communication controller 12A (or the second communication controller 12B), and the memory 13 of the controller 10.

As illustrated in FIG. 1, the encoder 40 is different from the controller 10 in that the encoder 40 has a single system combination of a processor and a communication controller, instead of having two system combinations. Additionally, the encoder 40 has two system combinations of a disc and a sensor to detect the position of the motor 30. In other words, the physical configuration of the encoder 40 has a single processor and a single communication controller, and two discs and two sensors. The processor 41, the communication controller 42, and the memory 43 of the encoder 40 may be respectively lower in performance (for example, clock number) than the first processor 11A (or the second processor 11B), the first communication controller 12A (or the second communication controller 12B), and the memory 13 of the controller 10.

The optical disc 44A is a first disc mounted on the rotation shaft of the motor 30. A non-limiting example of the optical disc 44A is what is called a code wheel, which is a disc of glass or metal. The optical disc 44A includes a plurality of slits. The plurality of slits are arranged at constant angle intervals to allow, for example, light from a light emitting device, described later, of the optical sensor 45A to transmit through the plurality of slits. The number of the slits may be determined based on the resolution of the optical sensor 45A with respect to the rotation position (angle) of the optical disc 44A within one rotation of the optical disc 44A.

The optical sensor 45A is a first sensor that detects the rotation position of the optical disc 44A within one rotation of the optical disc 44A. In other words, the optical sensor 45A is a rotation position sensor that detects the rotation position of the rotation shaft of the motor 30 within one rotation of the rotation shaft. The optical sensor 45A utilizes the strength of the light as the basis for detecting the rotation position of the rotation shaft of the motor 30 within one rotation of the rotation shaft. The optical sensor 45A includes a light emitting device and a photodetector. A non-limiting example of the light emitting device is a light-emitting diode, and a non-limiting example of the photodetector is a photodiode. The optical sensor 45A may be a transmission-type sensor or a reflection-type sensor. In the case of a transmission-type sensor, the optical disc 44A is located between the light emitting device and the photodetector, and the slits of the optical disc 44A transmit and block the light. In the case of a reflection-type sensor, the light emitting device and the photodetector are located on the same side facing the slits of the optical disc 44A, and the slits of the optical disc 44A reflect and stop reflecting the light. The optical sensor 45A generates a signal indicating the rotation position within one rotation and inputs the signal into the processor 41.

The magnetic disc 44B is a second disc mounted on the rotation shaft of the motor 30. That is, the optical disc 44A and the magnetic disc 44B are mounted on the same rotation shaft. Similarly to the optical disc 44A, a non-limiting example of the magnetic disc 44B is what is called a code wheel, which is a disc of glass or metal. The magnetic disc 44B includes at least one magnet or coil. It the case where the magnetic disc 44B is made of ferromagnetic material, the magnetic disc 44B itself may be subjected to magnetization treatment.

The magnetic sensor 45B is a second sensor that detects that the magnetic disc 44B has made one rotation. The magnetic sensor 45B is an encoder that utilizes a change in magnetism for detecting that the motor 30 has made one rotation. The magnetic sensor 45B includes elements such as a magnetic-field detection device and a coil, and may be a magnet-type sensor or a coil-type sensor. In the case of a magnet-type sensor, the magnetic sensor 45B uses a magnet to detect a change in magnetism. In the case of a coil-type sensor, the magnetic sensor 45B uses a coil to detect a change in magnetism. Examples of the magnetic-field detection device include, but are not limited to, a Hall effect device and a magneto-resistive device. The rotation of the magnetic disc 44B causes the magnetic field to change periodically, and the magnetic sensor 45B utilizes the periodic changes in the magnetic field as the basis for detecting that the motor 30 has made one rotation. Upon detecting that the motor 30 has made one rotation, the magnetic sensor 45B generates a predetermined signal and inputs the signal into the communication controller 42.

In this embodiment, in order to reduce the size and weight of the encoder 40, no resolvers are used because of their complicated auxiliary circuits that have a tendency to increase in size. Instead of resolvers, the optical sensor 45A and the magnetic sensor 45B are used in this embodiment. Another possible embodiment, however, is to use resolvers as replacements of the optical sensor 45A and the magnetic sensor 45B. The above-described physical configurations of the controller 10 and the encoder 40 should not be construed in a limiting sense; the controller 10 and the encoder 40 may include any other elements. For example, the memory 13 of the controller 10 may have two systems, or the encoder 40 may include a temperature sensor. For further example, the controller 10 and the encoder 40 may include a reader (for example, a memory card slot) that reads programs and data stored in a computer readable information storage medium.

The encoder 40 receives a position obtainment command from the controller 10 in every given sending period. The sending period is one of repeated predetermined periods. The sending period may be a parameter defined in the memory 13 of the controller 10 and/or the memory 43 of the encoder 40. In one sending period, the position obtainment command and sending data generated by the encoder 40 are sent and received between the controller 10 and the encoder 40.

The sending data generated by the encoder 40 includes two kinds of data, namely, first data and second sending data. The first data is for the controller 10 to check the operation of the encoder 40. The second sending data is for the controller 10 to perform positioning control with respect to the motor 30. In the following description, the first data will be referred to as safety data, and the second sending data will be referred to as normal data. Also in the following description, the first data and the second sending data may be collectively referred to as sending data.

Figure 2:
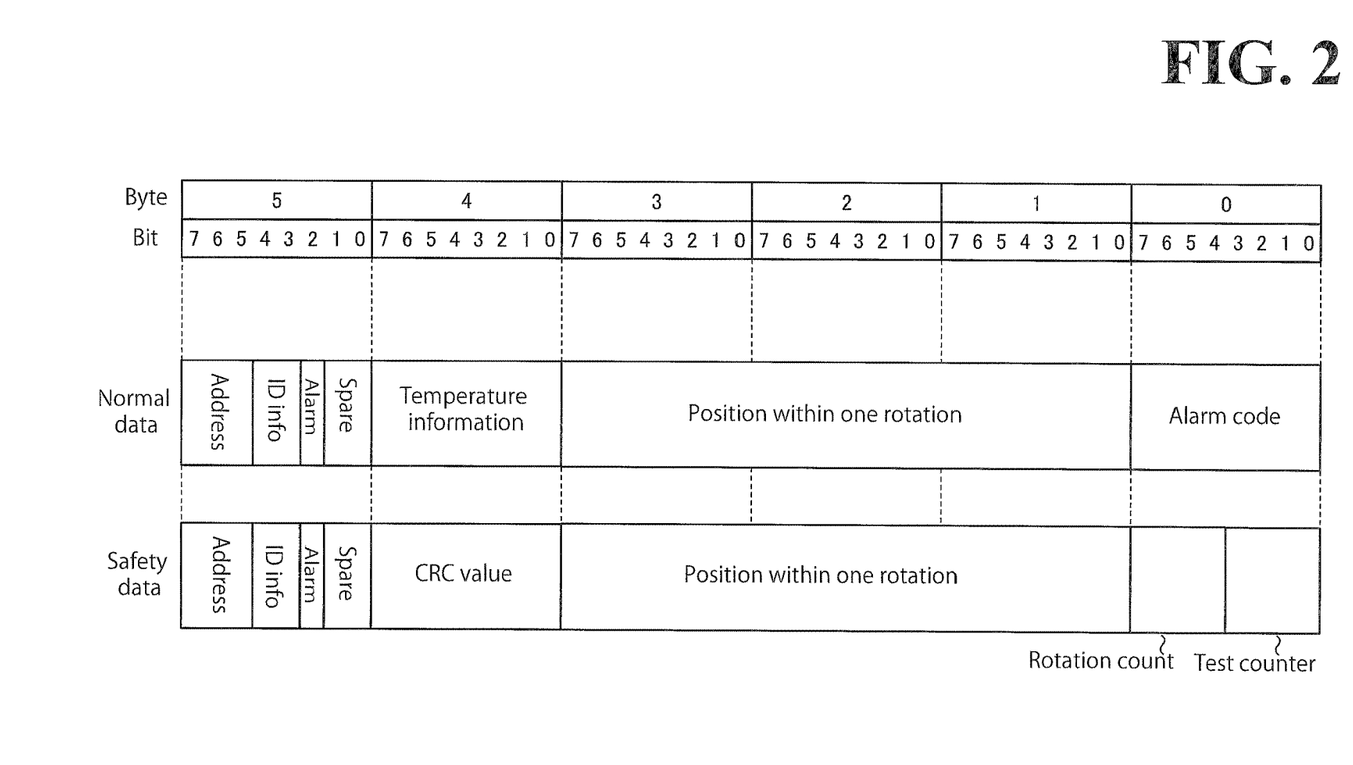
FIG. 2 illustrates an example of how sending data is stored.

FIG. 2 illustrates an example of how sending data is stored. In every sending period, the encoder 40 sends the normal data or the safety data illustrated in FIG. 2 to the controller 10. The sending data has a predetermined format, namely, data of 6-byte long in this embodiment. Some of the various kinds of data stored in the normal data and the safety data may be common to the normal data and the safety data. For example, as illustrated in FIG. 2, both the normal data and the safety data include rotation position within one rotation. In view of this, in one sending period, the encoder 40 generates sending data that at least includes the rotation position within one rotation. Then, the encoder 40 sends the sending data to the controller 10.

The first byte section of the normal data stores an alarm code that indicates alarm type. The second to fourth byte sections of the normal data store rotation position within one rotation. The fifth byte section of the normal data stores temperature information of the encoder 40. In other words, in the normal data, temperature information and alarm code are added to the rotation position within one rotation. In the following description, the temperature information and the alarm code will be collectively referred to as second addition information. The sixth byte section of the normal data stores an address that uniquely identifies the encoder 40, identification information that identifies the type of the sending data, and a presence or an absence of the alarm. The rest of the sixth byte section is a spare area. The identification information indicates whether the sending data is normal data or safety data. For example, when the identification information is "01", the sending data is normal data. When the identification information is "10", the sending data is safety data.

The first byte section of the safety data stores rotation count and a test counter (detailed later). The rotation count is a value indicating the number of rotations given in the unit: rotations. That is, the rotation count, as used herein, means what is called multiple rotations, instead of referring to rotation speed. The second to fourth byte sections and the sixth byte section of the safety data are respectively the same as the second to fourth byte sections of the normal data and the sixth byte section of the normal data. The fifth byte section of the safety data stores CRC (Cyclic Redundancy Check) value. The CRC value, which will be detailed later, is used to detect an error of the rotation count stored in the first byte section and an error of the test counter stored in the first byte section. In other words, in the safety data, CRC value, rotation count, and test counter are added to the rotation position within one rotation. In the following description, the CRC value, the rotation count, and the test counter will be collectively referred to as first addition information.

In the motor control system 1, the controller 10 calculates the rotation count based on the rotation position within one rotation included in the safety data, and compares the calculated rotation count with the rotation count included in the safety data. In this manner, the controller 10 implements a first function to check data validity. That is, even though the encoder 40 has a single system combination of the processor 41 and the communication controller 42, instead of having two system combinations, the encoder 40 does have two system combinations of a disc and a sensor and thus ensures data reliability approximately equivalent to data reliability ensured by implementing data duplication.

Further, one sending period in motor control is generally short, whereas the calculation of the first addition information is so time-consuming that the calculation of the first addition information does not finish within one sending period. In view of the circumstances, the motor control system 1 implements a second function to send the normal data until the calculation of the first addition information ends and to send the safety data upon finish of the calculation of the first addition information. That is, the motor control system 1 sends to the controller 10 the first addition information, which is generated in a period longer than one sending period. In the following description, the first function and the second function implemented by the motor control system 1 will be detailed.

3. Functions Implemented in Motor Control System

Figure 3:
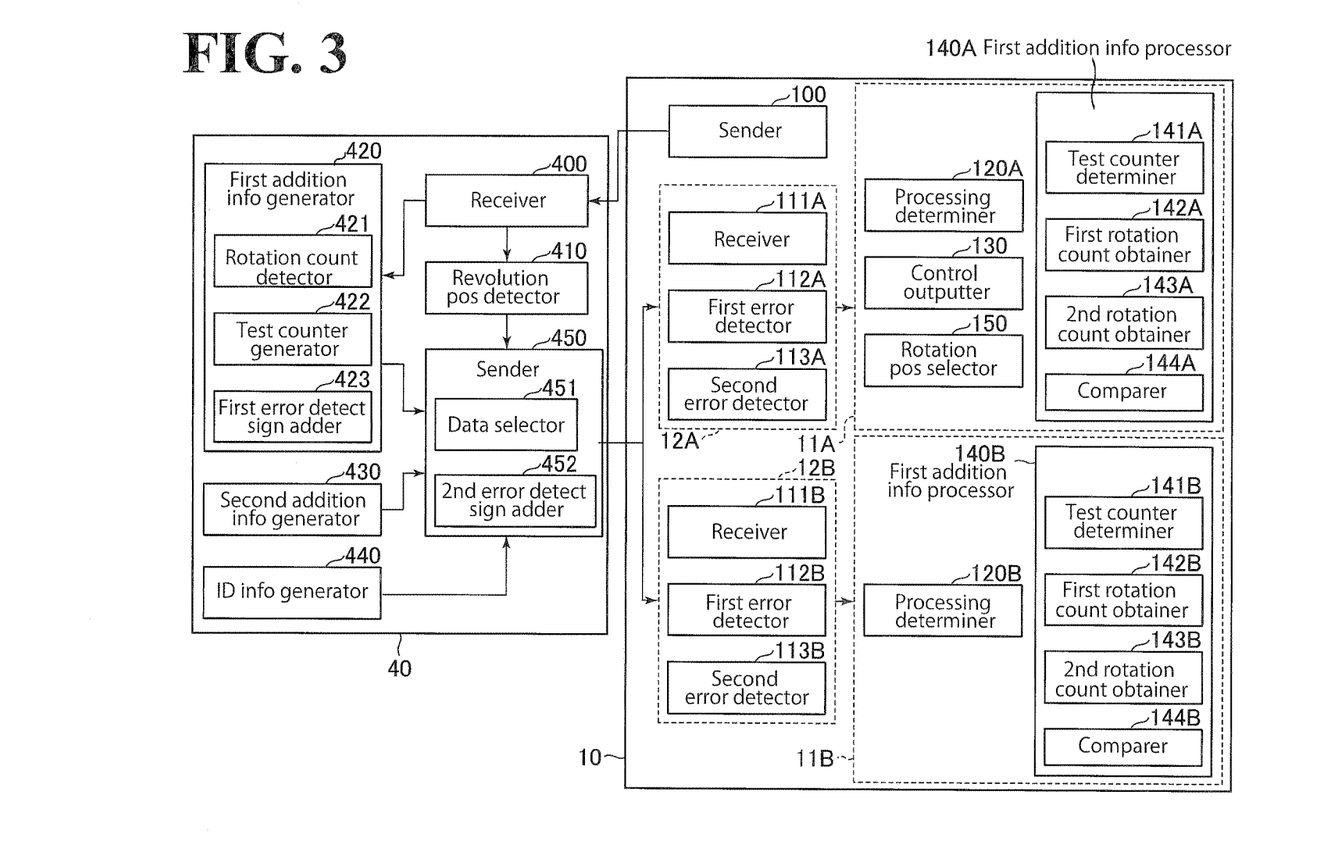
FIG. 3 is a functional block diagram of the motor control system.

FIG. 3 is a functional block diagram of the motor control system 1. The following description is concerning the functions of the controller 10 and the encoder 40, among the functions implemented in the motor control system 1. In the following description, the first processor 11A and the first communication controller 12A of the controller 10 are mainly used, and the second processor 11B and the second communication controller 12B are subordinate to the first processor 11A and the first communication controller 12A. Being subordinate means using the subordinate elements to check the operation of the encoder 40.

The controller 10 includes a sender 100, a receiver 111A, a first error detector 112A, and a second error detector 113A.

These elements are implemented by the first communication controller 12A. The controller 10 also includes a receiver 111B, a first error detector 112B, and a second error detector 113B. These elements are implemented by the second communication controller 12B. The controller 10 also includes a processing determiner 120A, a control outputter 130, a first addition information processor 140A, and a rotation position selector 150. These elements are implemented by the first processor 11A. The controller 10 also includes a processing determiner 120B and a first addition information processor 140B. These elements are implemented by the second processor 11B.

The encoder 40 includes a receiver 400, an identification information generator 440, and a sender 450. These elements are implemented by the communication controller 42. The encoder 40 also includes a rotation position detector 410 and the communication controller 42. These elements are implemented by the optical sensor 45A. The encoder 40 also includes a first addition information generator 420 and a second addition information generator 430. These elements are implemented by the processor 41 and the magnetic sensor 45B.

Figure 4:
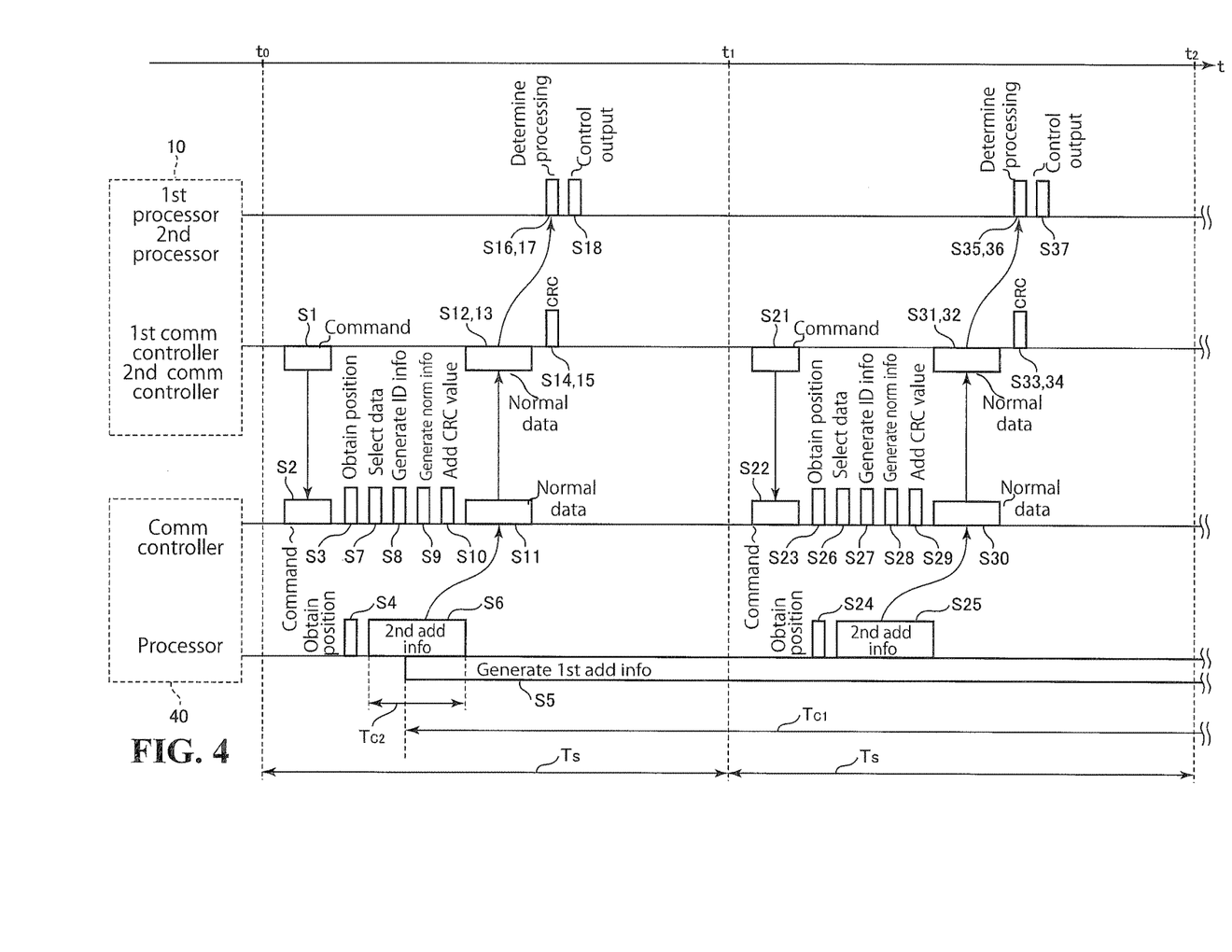
FIG. 4 illustrates a flow of processing performed in the motor control system.
Figure 5:
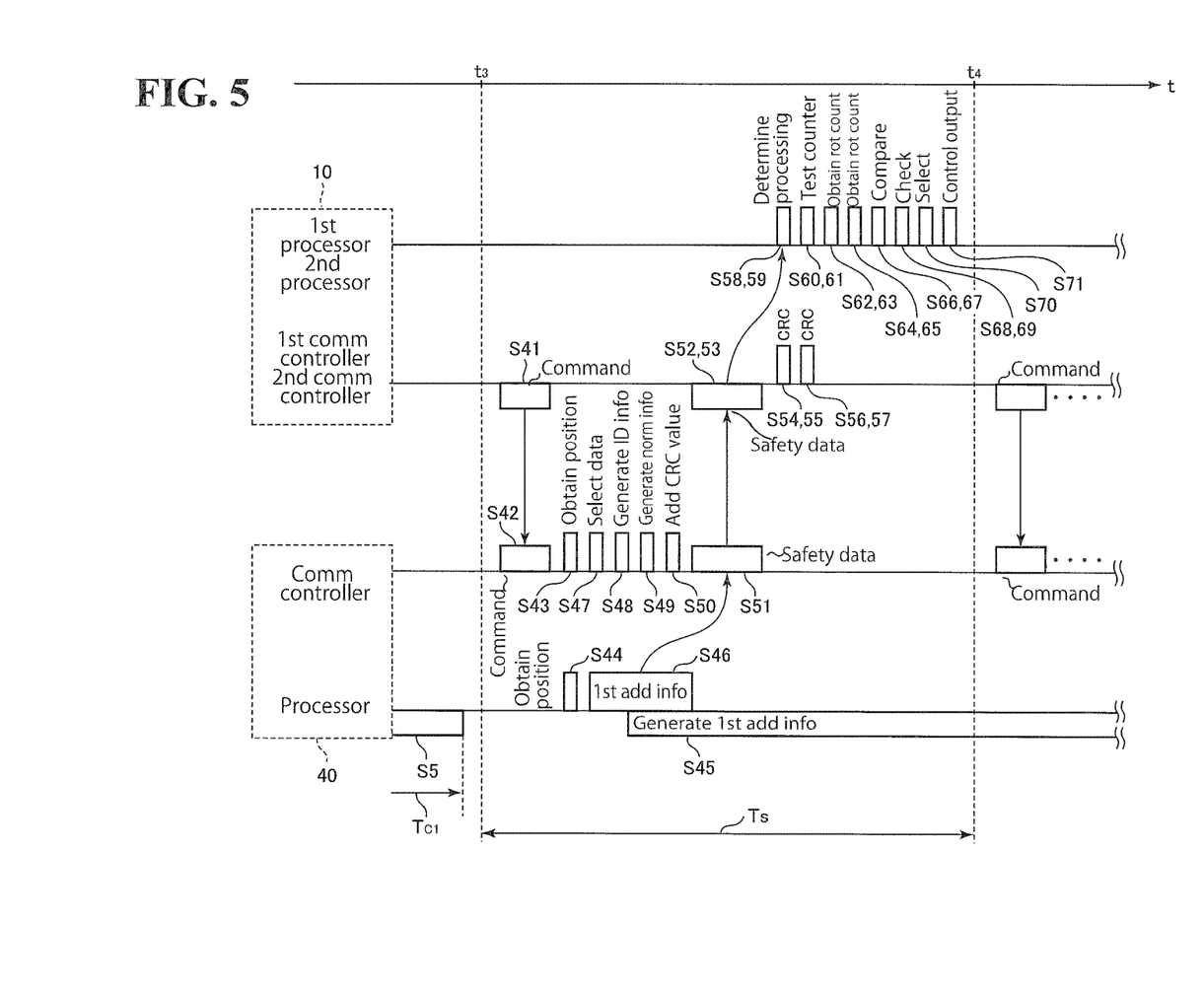
FIG. 5 illustrates a flow of processing performed in the motor control system.

FIGS. 4 and 5 illustrates flows of processings performed in the motor control system 1. By referring to FIGS. 4 and 5, the functions of the motor control system 1 illustrated in FIG. 3 will be described. The t-axis illustrated in FIGS. 4 and 5 represents time.

As illustrated in FIG. 4, at the start time point t0 of the sending period $T_S$, the sender 100 of the controller 10 sends a position obtainment command to the encoder 40 (S1). The position obtainment command is a command that causes the encoder 40 to obtain the position of the motor 30. The position obtainment command may be any command insofar as the command has a predetermined data form. The position obtainment command includes, for example, a command code indicating command type. The position obtainment command may include other information such as information that identifies the destination of the position obtainment command, namely, the encoder 40.

The receiver 400 of the encoder 40 receives the position obtainment command from the controller 10 (S2). Then, the rotation position detector 410 and a rotation count detector 421 each execute the position obtainment command (S3, S4). At S3, the rotation position detector 410 detects the rotation position within one rotation based on a signal from the optical sensor 45A. As detailed later, the rotation position within one rotation is incorporated into the safety data, generated later, and in view of this, the rotation position within one rotation is held in a memory provided in the communication controller 42. At S4, based on a signal from the magnetic sensor 45B, the rotation count detector 421 determines whether the motor 30 has made one rotation.

The first addition information generator 420 generates the first addition information in a period of $T_{C1}$, which is longer than at least the data sending period $T_S$ (S5). The period $T_{C1}$ is a period of time necessary for generating the first addition information. In other words, the period $T_{C1}$ is the period of time between the start and finish of the generation of the first addition information. As described above, the first addition information is added to the rotation position within one rotation, and therefore can be rephrased as information to be sent together with the rotation position within one rotation. In this embodiment, the first addition information includes the rotation count, the test counter, and the CRC value. At S5, the rotation count detector 421, a test counter generator 422, and a first error detection sign adder 423 of the first addition information generator 420 perform the following processings.

The rotation count detector 421 counts the rotation count of the magnetic disc 44B based on the output of the magnetic sensor 45B. In other words, the rotation count detector 421 detects the rotation count of the rotation shaft of the motor 30. For example, the data indicating the rotation count may be stored in the memory 43 or in a memory provided in the processor 41. When the rotation count detector 421 receives from the magnetic sensor 45B a signal indicating that the magnetic disc 44B has made one rotation, the rotation count detector 421 increases the rotation count indicated by the above-described data. The data indicating the rotation count may return to its initial value (for example, 0) at the time when power is on or by initialization processing performed at a predetermined timing after power is on.

The test counter generator 422 generates a test counter that indicates a value that differs on a safe-data sending basis. Differing on a safe-data sending basis means that a test counter included in one safety data has a value different from the value of the test counter included in the next safety data. For example, every time safety data is sent, the test counter generator 422 increases the value of the test counter included in the safety data. The test counter may be stored in a memory provided in the processor 41. Similarly to the rotation count, the test counter may return to its initial value (for example, 0) at the time when power is on or by initialization processing performed at a predetermined timing after power is on.

The first error detection sign adder 423 adds an error detection sign to information (for example, the rotation count) included in the first addition information. Adding an error detection sign to information means making this information a subject of calculation by the error detection sign. In this embodiment, CRC will be described as a non-limiting example of error detection. That is, the error detection sign is a CRC value. It is noted, however, that error detection will not be limited to CRC; any of various other known methods are applicable. Other examples of the method of error detection include, but are not limited to, a method that uses a parity bit and a method that uses a checksum.

In this embodiment, the first error detection sign adder 423 adds a CRC value to the rotation count and the test counter. It is also possible for the first error detection sign adder 423 to add a CRC value to the rotation count alone. The method of calculating the CRC value may be any of various known methods. A non-limiting example is CRC-8. An algorithm for calculating the CRC value is described in a program. The first error detection sign adder 423 inputs into the calculation algorithm the subjects of CRC calculation (namely, the rotation count and the test counter in this embodiment) and obtains a CRC value, which is the output of the calculation algorithm. The calculation algorithm used by the first error detection sign adder 423 is executed by the general-purpose processor 41, as described above, without using a dedicated calculation circuit. This necessitates the period $T_{C1}$ in the calculation.

At S5, the above-described processing is performed. Here, as described above, the first addition information generator 420 does not finish the calculation of the first addition information within the communication period $T_S$, as described above. In view of the circumstances, in a period of $T_{C2}$, which is shorter than the data sending period $T_S$, the second addition information generator 430 generates the second addition information (for example, the temperature information and the alarm code), which includes information indicating a state of the encoder 40 (S6). The sending period $T_{C2}$ is a period of time necessary for the second addition information generator 430 to generate the second addition information. In other words, the sending period $T_{C2}$ is the period of time between the start and finish of the generation of the second addition information.

At S6, the second addition information generator 430 obtains the temperature information from the temperature sensor. Then, the second addition information generator 430 obtains the presence or absence of an alarm and an alarm code based on a given alarm detection algorithm. The alarm detection algorithm and the alarm code may be described in a program. The alarm may be any of various known alarms. Examples of the alarm include, but are not limited to, an alarm indicating a malfunction of the power source and an alarm indicating an abnormality in communication. The processing at S6 may be performed before the position obtainment command is received at S2, or may be performed after the position obtainment command has been executed at S3 or S4, insofar as the second addition information is generated so that the sending of the normal data finishes until the communication period $T_S$ ends.

A sending data selector 451 of the sender 450 selects which data to send at least from the normal data and the safety data (S7). The sending data selector 451 may select other data than the normal data and the safety data. In this embodiment, for simplicity of description, the sending data selector 451 selects one of the normal data and the safety data.

At S7, the sending data selector 451 may select one of the normal data and the safety data by a given selection method. For example, the sending data selector 451 selects the safety data when the first addition information has been generated by the first addition information generator 420. That is, the sending data selector 451 selects the normal data when no first addition information has been generated, and selects the safety data when the first addition information has been generated. At the time of S7, the first addition information generator 420 has just started the calculation at S5 and has not generated the first addition information yet. Therefore, the sending data selector 451 selects the normal data. In this embodiment, the safety data is sent when the generation of the first addition information finishes. Another possible embodiment is to send the safety data at predetermined periodic intervals. In this case, the sending data selector 451 determines whether a predetermined period has come or predetermined periods have come so as to select one of the normal data and the safety data.

The identification information generator 440 generates identification information that at least identifies a sending of the first addition information (S8). While the identification information may identify the sending of the first addition information alone, the identification information in this embodiment identifies whether the first addition information or the second addition information is sent. The identification information may identify any other additional information.

When the sending data selector 451 has selected the normal data, the identification information generator 440 generates identification information that indicates "01" to identify the normal data. When the sending data selector 451 has selected the safety data, the identification information generator 440 generates identification information that indicates "10" to identify the safety data. Since the normal data has been selected at S7, the identification information generator 440 at S8 generates the identification information that indicates "01" to identify the normal data.

The sender 450 generates normal data that includes the rotation position within one rotation detected at S3, the second addition information generated at S6, and the identification information generated at S8 (S9). The address included in the normal data is stored in advance in the memory 43. The presence or the absence of the alarm included in the normal data may be determined based on a result obtained by generating the second addition information at S6. The spare area included in the normal data may not necessarily store data or may store a predetermined value.

A second error detection sign adder 452 of the sender 450 adds an error detection sign to the normal data generated at S9 (S10), and the sender 450 sends the normal data (S11). At S10, the second error detection sign adder 452 adds an error detection sign to information included in the normal data. As described later, the second error detection sign adder 452 adds an error detection sign not only to the normal data but also to information included in the safety data. Similarly to the case of the first error detection sign adder 423, CRC will be described as a non-limiting example of error detection. That is, the error detection sign is a CRC value. It is noted, however, that error detection will not be limited to CRC, similarly to the case of the first error detection sign adder 423. The second error detection sign adder 452 may calculate a CRC value for the normal data as a whole or may calculate a CRC value for some of the information included in the normal data (for example, the rotation position within one rotation). As described above, the second error detection sign adder 452 is implemented by a dedicated circuit provided in the communication controller 42, which is a dedicated integrated circuit. This configuration ensures relatively faster calculation and enables the second error detection sign adder 452 to calculate the CRC value within the sending period $T_S$.

At the controller 10, the receivers 111A and 111B receive the normal data (S12, S13). The second error detectors 113A and 113B check the CRC value added to the normal data (S14, S15). At S14 and S15, the second error detectors 113A and 113B calculate CRC values based on the normal data received from the encoder 40. The method of calculating the CRC values may be the same as the above-described method. The second error detectors 113A and 113B each compare the calculated CRC value with the CRC value received from the encoder 40 to determine whether the calculated CRC value and the CRC value received from the encoder 40 match. When the calculated CRC value and the CRC value received from the encoder 40 match, the second error detectors 113A and 113B determine the match as a normality. When the calculated CRC value and the CRC value received from the encoder 40 do not match, the second error detectors 113A and 113B determine the mismatch as an occurrence of an abnormality. As used herein, the abnormality means a lack or change of some of the normal data that can occur on the transmission path due to the influence of noise or other causes.

The processing determiners 120A and 120B refer to the identification information included in the normal data (S16, S17). When at S16 and S17 the identification information indicates "01", which identifies the normal data, the processing determiners 120A and 120B determine to perform positioning control with respect to the motor 30. When at S16 and S17 the identification information indicates "10", which identifies the safety data, the processing determiners 120A and 120B determine to perform safety verification processing. Since the received identification information indicates "01", which identifies the normal data, the processing determiners 120A and 120B determine to make a control output to the motor controller 20.

The control outputter 130 determines a control output made to the motor 30 (S18). At S18, the control outputter 130 determines the control output made to the motor 30 based on the rotation position within one rotation included in the normal data received at S11. A non-limiting example of the control output is at least one of the position and speed of the motor 30. Based on the obtained control output, the motor controller 20 controls the current applied through the motor 30.

When the end time point, t1, of the sending period $T_S$ comes while the above-described processings are performed, the next sending period $T_S$ starts. At this point of time, as indicated at S5, the generation of the first addition information has not finished yet. In view of circumstances, as indicated at S21 to S37, processings similar to the processings at S1 to S4 and S6 to S18 are performed. Specifically, the sending and receipt of a position obtainment command, the sending and receipt of normal data, and the making of a control output are repeated until the generation of the first addition information finishes. Here, at the controller 10, rotation positions within one rotation included in normal data are accumulated on a time-series basis in a memory provided in the first processor 11A and/or in a memory provided in the second processor 11B. This is for the purpose of using changes in the rotation position within one rotation to calculate the rotation count at S62 and S63, described later.

Referring to FIG. 5, when the generation of the first addition information finishes and the start time point, t3, of the next sending period $T_C$ comes, the processing of sending the safety data is performed. The processings at S41 to S45 are respectively similar to the processings at S1 to S5. At S46, the first addition information generator 420 sends to the sender 450 the first addition information generated by the first addition information generator 420 (S46).

Since the generation of the first addition information has finished, the sending data selector 451 selects the safety data (S47), and the identification information generator 440 generates the identification information that indicates "10", which identifies the safety data (S48). The processings at S49 to S55 are respectively approximately similar to the processings at S9 to S15; a difference is that at S51, the sender 450 sends safety data that includes the rotation position within one rotation and the rotation count, instead of sending the normal data.

The calculation of the first addition information is time-consuming, as described above, and if the latest rotation position within one rotation obtained at S43 is incorporated into the safety data, no operation abnormality may possibly be detected in the comparison performed at S66, described later. That is, the rotation count included in the first addition information is as measured at time points t0 and t1, and if the latest rotation position within one rotation is incorporated into the safety data, the comparison is made between the rotation count as measured at time points t0 and t1 and the rotation count as measured at time points t3 and t4. In view of the circumstances, the rotation position within one rotation included in the safety data corresponds to the rotation position within one rotation obtained at the timing at which the rotation count detector 421 detected the rotation count (that is, the rotation position within one rotation obtained at S3). As used herein, the rotation position obtained at the timing at which the rotation count was detected means a rotation position obtained at a position obtainment command to detect the rotation count. In other words, the rotation position obtained at the timing at which the rotation count was detected is a rotation position within one rotation obtained within the same sending period $T_S$ in which the rotation count was detected. Since the rotation position within one rotation is held in the memory provided in the processor 41, as described above, the value of the rotation position within one rotation is incorporated into the safety data.

At S52 and S53, the receivers 111A and 111B receive, from the encoder 40 of the motor 30, safety data that includes the rotation position of the rotation shaft of the motor 30 within one rotation of the rotation shaft; and the rotation count, instead of receiving normal data. In other words, the receiver 111A receives, from the encoder 40 of the motor 30, safety data that includes the rotation position of the rotation shaft of the motor within one rotation of the rotation shaft; identification information that indicates that at least the first addition information is included in the safety data; and the first addition information.

The first error detectors 112A and 112B each check the CRC value added to the rotation count included in the safety data (S56, S57). At S56 and S57, the first error detectors 112A and 112B each calculate a CRC value based on the rotation count and the test counter included in the safety data received from the encoder 40. Then, the first error detectors 112A and 112B each compare the calculated CRC value with the CRC value included in the safety data to determine whether the calculated CRC value and the CRC value included in the safety data match. When the calculated CRC value and the CRC value included in the safety data match, the first error detectors 112A and 112B determine the match as a normality. When the calculated CRC value and the CRC value included in the safety data do not match, the first error detectors 112A and 112B determine the mismatch as an occurrence of an abnormality.

Since the identification information included in the received safety data indicates "10", the processing determiners 120A and 120B determine to perform safety verification processing (S58, S59). At S60 to S69, the first addition information processors 140A and 140B perform the safety verification processing based on the identification information. The safety verification processing is information processing that uses the first addition information, when the first addition information is included in the safety data. The information processing may be any other processing than the safety verification processing insofar as the information processing is performed by referring to the first addition information.

Test counter determiners 141A and 141B each determine whether the value indicated by the test counter included in the safety data is correct (S60, S61). In the memory 13 or some other place in the controller 10, a value indicated by the test counter included in safety data received from the encoder 40 in the past is held. At S60 and S61, the test counter determiners 141A and 141B each compare the value indicated by the test counters included in the safety data received in the past with the value indicated by the test counter received at S51 and S52 to determine whether the value indicated by the test counter included in the safety data received in the past is different from the value indicated by the test counter received at S51 and S52. As described above, the test counter varies on a safety-data sending basis. Therefore, as long as the encoder 40 is operating normally, the test counter indicates a different value. At S58 and S59, when the compared values indicated by the two test counters are different from each other, the test counter determiners 141A and 141B determine the difference as a normality.

When the compared values indicated by the two test counters match, the test counter determiners 141A and 141B determine the match as an occurrence of an abnormality.

First rotation count obtainers 142A and 142B obtain the rotation count of rotation shaft based on the rotation position within one rotation (S62, S63). At S62 and S63, the first rotation count obtainers 142A and 142B obtain the rotation count of the rotation shaft based on a change in the rotation position within one rotation. For example, the first rotation count obtainers 142A and 142B refers to a past rotation position within one rotation held in the memory 13 or some other place in the controller 10 so as to identify a change in the rotation position within one rotation. The rotation position within one rotation returns to initial position after making one rotation. Thus, when the rotation position within one rotation returns to initial position (that is, when the rotation position decreases), the first rotation count obtainers 142A and 142B determine that the rotation shaft has made one rotation. Then, the first rotation count obtainers 142A and 142B increase the value indicated by the counter of the rotation count stored in the memory 13 or some other place in the controller 10. In this manner, the first rotation count obtainers 142A and 142B calculate the rotation count.

Second rotation count obtainers 143A and 143B obtain the rotation count included in the safety data (S64, S65). At S64 and S65, the second rotation count obtainers 143A and 143B obtain the rotation count included in the first addition information.

Comparers 144A and 144B compare the rotation count obtained by the first rotation count obtainers 142A and 142B with the rotation count obtained by the second rotation count obtainers 143A and 143B (S66, S67). At S66 and S67, the comparers 144A and 144B compare the rotation count obtained by the first rotation count obtainers 142A and 142B with the rotation count obtained by the second rotation count obtainers 143A and 143B to determine whether the rotation count obtained by the first rotation count obtainers 142A and 142B and the rotation count obtained by the second rotation count obtainers 143A and 143B match. When the rotation count obtained by the first rotation count obtainers 142A and 142B and the rotation count obtained by the second rotation count obtainers 143A and 143B match, the comparers 144A and 144B determine the match as a normality. When the rotation count obtained by the first rotation count obtainers 142A and 142B and the rotation count obtained by the second rotation count obtainers 143A and 143B do not match, the comparers 144A and 144B determine the mismatch as an occurrence of an abnormality.

The first addition information processors 140A and 140B cross-check the comparison results obtained at S66 and S67 (S68, S69). When there is an abnormality occurring in any one of the comparison results, the first addition information processors 140A and 140B may send an instruction to the motor controller 20 to stop the motor 30. Alternatively, when there are abnormalities occurring in both the comparison results, the first addition information processors 140A and 140B may send an instruction to the motor controller 20 to stop the motor 30.

The rotation position selector 150 selects, from a plurality of pieces of data, the rotation position that is to be used by the control outputter 130 (S70). As described above, the rotation position within one rotation included in the safety data is an old rotation position generated at S3. In view of the circumstances, the rotation position selector 150 selects the rotation position from sending data other than safety data (that is, from the normal data). For example, the rotation position selector 150 selects the rotation position within one rotation included in the most recently received normal data. S71, which is the next step, is similar to S18.

As described above, after the safety data has been sent through the processings at S41 to S71, a start time point t4 of the next sending period $T_S$ comes, and the normal data is sent. In the steps that follow, the normal data is sent until the generation of the first addition information finishes. When the generation of the first addition information finishes, the safety data is sent. That is, the sender 450 sends either the normal data or the safety data in every sending period $T_S$. In other words, the sender 450 sends, in the sending period $T_S$, sending data that at least includes the rotation position within one rotation.

4. Outline of First Function

The first function of the motor control system 1 ensures a check of duplicated data from the encoder, namely, the rotation position of the optical disc 44A within one rotation of the optical disc 44A and the rotation count of the magnetic disc 44B. This configuration eliminates or minimizes increases in the size and weight of the equipment and eliminates or minimizes resulting increases in cost while implementing duplication of data from the encoder. Specifically, it is common practice to duplicate the encoder 40 itself or duplicate a position detection circuit such as the processor 41 and the communication controller 42. Compared with these duplication practices, the first function of the motor control system 1 eliminates or minimizes increases in the size and weight of the equipment and eliminates or minimizes resulting increases in cost. Further, the first function of the motor control system 1 ensures data reliability equivalent to these duplication practices. Further, since the encoder is implemented by the optical sensor 45A, the encoder is smaller in size than the case of using a resolver or a similar device.

Also, the first function of the motor control system 1 performs a double check using a CRC value for the rotation count and a CRC value for the sending data. This configuration improves data reliability. Further, if the CRC values are calculated using single hardware, an abnormality may not possibly be detected when the hardware is malfunctioning. Contrarily, this embodiment uses two kinds of hardware, namely, the processor 41 and the communication controller 42 to calculate the CRC values. This configuration further improves data reliability.

It is common practice to shorten the length of the entire sending data in an attempt to improve data transmission efficiency. This practice, however, involves so large the number of bits that it is difficult or impossible to use comparatively strong CRC. This embodiment eliminates the need for using comparatively strong CRC; instead, the checking of the rotation count ensures data reliability.

Further, a CRC value is added not only to the rotation count but also to the test counter, which indicates a different value on a safety-data sending basis. This configuration ensures that even when the rotation count is not updated such as during the time when the motor 30 is stationary and during the time when the motor 30 is operating at low speed, referring to the test counter ensures check of whether the encoder 40 is operating normally.

Also, the first function of the motor control system 1 uses a combination of the optical disc 44A and the magnetic disc 44B to detect the rotation position and the rotation count of the motor using different detection methods. This configuration ensures that in a dusty environment, to which the optical disc 44A is susceptible, the magnetic disc 44B ensures accurate position detection and accurate abnormality detection. Additionally, in an environment that causes magnetic change, to which the magnetic disc 44B is susceptible, the optical disc 44A ensures accurate position detection and accurate abnormality detection.

Also in the first function of the motor control system 1, the controller 10 uses two kinds of hardware, namely, the first processor 11A and the second processor 11B to compare the rotation count obtained based on a change in the rotation position with the rotation count included in the sending data. This configuration ensures check of whether the encoder 40 is operating normally. The controller 10 also uses two kinds of hardware, namely, the first communication controller 12A and the second communication controller 12B to check CRC values. This configuration improves the accuracy of data reliability verification.

5. Outline of Second Function

The second function of the motor control system 1 ensures that the first addition information, which includes a CRC value, is sent to the controller 10, even though the CRC value takes a plurality of sending periods $T_S$ to generate. For example, in the case where the first addition information is sent in every sending period $T_S$, it is necessary to generate the first addition information before the next sending period $T_S$ comes. In this case, it is necessary to use a general-purpose processor that operates at high speed or use a dedicated integrated circuit. In view of the circumstances, the second function of the motor control system 1 ensures that the first addition information can be sent even using a general-purpose processor that is comparatively lower in cost, slower in clock speed, and lower in specifications.

Also, even though the first addition information takes a plurality of sending periods $T_S$ to generate, the second function of the motor control system 1 ensures addition of an error detection sign to information that needs error detection. The second function of the motor control system 1 also ensures error detection using a CRC value, which is time-consuming in its calculation.

Also, the safety data includes the rotation position and the first addition information includes the rotation count. This configuration ensures double check of data at the controller 10 or some other device. This configuration ensures data check by, for example, obtaining the rotation count from the rotation position included in the safety data and comparing the obtained rotation count with the rotation count included in the first addition information.

As described above, if the latest rotation position within one rotation is incorporated into the safety data, an accurate check may not possibly be ensured. In view of the circumstances, the rotation position within one rotation used in the second function of the motor control system 1 is the rotation position at the timing at which the rotation count is detected. This configuration ensures an accurate double check. Further, even when the rotation count is not updated such as during the time when the motor is stationary, referring to the test counter ensures a check as to whether the encoder 40 is operating normally.

Also, the second function of the motor control system 1 selects which of the normal data and the safety data to send within one sending period $T_S$. This configuration ensures waste-less or waste-minimized data transmission. For example, the second function of the motor control system 1 ensures selective sending of the safety data or the normal data in each sending period $T_S$, with the safety data including the first addition information, which takes a plurality of sending periods $T_S$ to generate, and with the normal data including the second addition information, which can be reliably generated within one sending period $T_S$. This configuration ensures efficient data transmission. Thus, either the normal data or the safety data is selectively sent, instead of the normal data and the safety data being sent simultaneously. This configuration shortens the sending period $T_S$ and reduces the volume of data to be sent in one sending period $T_S$. It is when the safety data is ready for sending after the first addition information has been generated that the safety data is sent. Otherwise, the normal data is sent. This configuration ensures waste-less or waste-minimized data transmission.

Also, a CRC value is added to the sending data as a whole. This configuration ensures addition of an error detection sign to information in the sending data as a whole that needs error detection. For example, the safety data includes the CRC value added to the first addition information and the CRC value added to the safety data as a whole. This configuration ensures double error detection, namely, error detection in the first addition information and error detection in the sending data as a whole.

Also, since the sending data includes the identification information, the controller 10 uses the identification information as a basis for identifying the first addition information included in the sending data and is able to perform information processing such as data check. The controller 10 is also able to check the operation of the encoder 40 by comparing the rotation count obtained based on the rotation position with the rotation count included in the first addition information. Since the rotation position within one rotation included in the safety data is an old rotation position, not latest, the controller 10 uses the most recent rotation position within one rotation to control the motor 30. This configuration improves motor control accuracy.

6. Modifications

While in the above-described embodiment the motor control system 1 implements both the first function and the second function, the motor control system 1 may implement either the first function or the second function.

When the motor control system 1 implements the first function alone, it is not essential to change the sending data between the normal data and the safety data. Therefore, the processing determiners 120A and 120B may be omitted from the controller 10, and the sending data selector 451 and the identification information generator 440 may be omitted from the encoder 40. That is, it is not necessary for the encoder 40 to change the sending data between the normal data and the safety data. Thus, the encoder 40 may send a single kind of sending data. In this case, the sending data may include the rotation position within one rotation and the rotation count. Further, the encoder 40 may finish the generation of the first addition information within one sending period $T_S$. In this case, the encoder 40 may send both the normal data and the safety data at a time.

When the motor control system 1 implements the second function alone, hardware duplication is not essential. Therefore, the controller 10 may include either the receiver 111A or the first addition information processors 140A and 140B. The controller 10 may have a single system combination of a processor and a communication controller. Similarly, the encoder 40 may have a single system combination of a disc and a sensor. Further, the sending data may not necessarily include both the rotation position within one rotation and the rotation count. Instead, the sending data may include at least the rotation position within one rotation. The encoder 40 may not necessarily detect the rotation count. In this case, the controller 10 may calculate the rotation count based on a rotation position received in the past.

FIG. 2 should not be construed as limiting how the sending data is stored. Insofar as the sending data includes the rotation position within one rotation, the sending data may include any other information. For example, the safety data may include temperature information. Similarly, the first addition information and the second addition information may include any other information. For example, the first addition information may not necessarily include a CRC value or the test counter; the first addition information may include any other information.

With regard to the first function, the discs included in the encoder 40 will not be limited to the combination of the optical disc 44A and the magnetic disc 44B. For example, the encoder 40 may include two optical discs or two magnetic discs. The above-described embodiment employs two system combinations of a disc and a sensor to ensure data reliability approximately equivalent to data reliability ensured by implementing data duplication. Another possible embodiment is to employ multiple (three or more) system combinations of a disc and a sensor to ensure data reliability approximately equivalent to data reliability ensured by implementing data multiplication (equal to or more than triplication).

With regard to the second function, the first addition information may be any other information that takes a time longer than the sending period $T_S$ to generate. The first addition information may be other than the error detection sign, such as a CRC value. Also, the first addition information may be included in the normal data. In this case, until the generation of the first addition information finishes, the most recently generated first addition information may be included in every normal data. The normal data may not necessarily include the second addition information.

In the controller 10, the first communication controller 12A and the second communication controller 12B may perform CRC with respect to the sending data. Another possible embodiment is that the first processor 11A and the second processor 11B perform CRC with respect to the sending data. Also, not only the rotation count and the test counter but also the address may be a subject of CRC calculation.

While in the above-described the motor control system 1 includes the controller 10, the motor controller 20, the motor 30, and the encoder 40, the motor control system 1 may only include the controller 10 and the encoder 40.

Figure 6:
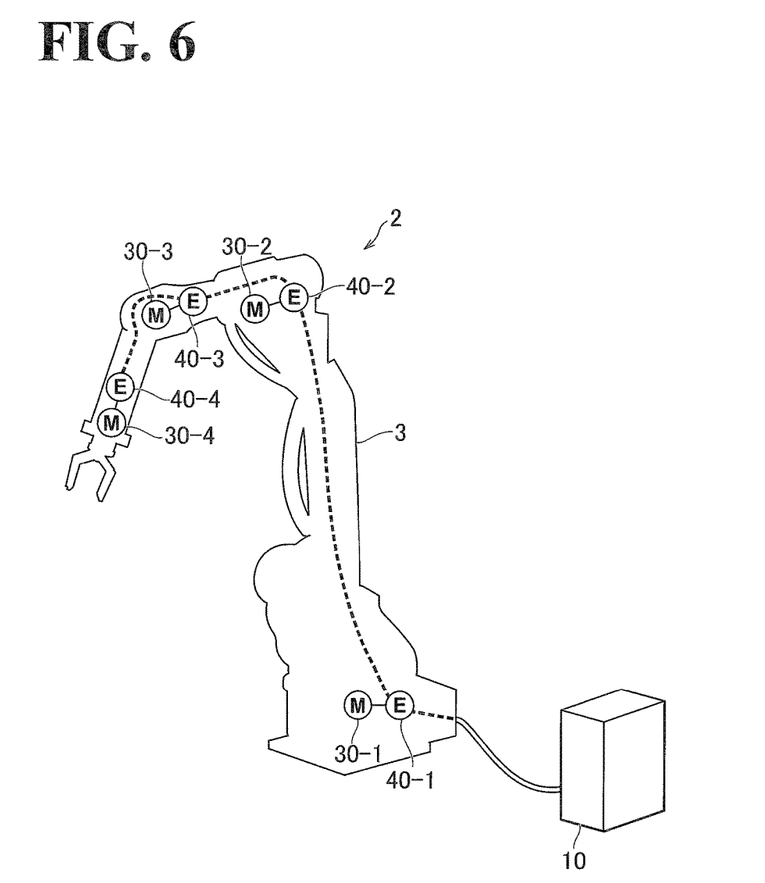
FIG. 6 illustrates an exemplary robot system.

The above-described processings of the embodiment may be applied to robot systems. FIG. 6 illustrates an exemplary robot system. As illustrated in FIG. 6, a robot system 2 includes the motor control system 1 and a robot 3. It is noted that FIG. 6 omits the motor controller 20 for simplicity of description. The robot 3 is a subject of control by the controller 10 and includes the motor 30 and the encoder 40, for example. That is, the motor 30 and the encoder 40 are built in the robot 3. In the example illustrated in FIG. 6, the robot 3 includes a manipulator with an arm. Also in this example, the robot 3 is a concept that encompasses multi-axial machines (for example, converting machines for metals), which have equal to or more than two axes. The robot 3 illustrated in FIG. 6 includes four motors 30-1 to 30-4 and therefore is a four-axis machine.

In the robot system 2, the controller 10 instructs the motors 30-1 to 30-4 to turn so as to operate the robot 3. For example, the controller 10 controls the motors 30-1 to 30-4 to turn so as to make the arm of the robot 3 hold an object at a predetermined position and at a predetermined timing. In this example, the encoders 40-1 to 40-4 are respectively connected to the motors 30-1 to 30-4. In the example illustrated in FIG. 6, the encoders 40-1 to 40-4 are connected to each other in a daisy-chain configuration through a wiring indicated by the broken line illustrated in FIG. 6. Examples of the wiring include, but are not limited to, a half-duplex communication path and a full-duplex communication path. Daisy-chain connection is a form of connection in which a plurality of devices are wired together in a chain so that data is forwarded in order of connection, from an uppermost-level device to a lowermost-level device. In this example, the encoder 40-1 is on the uppermost-level in the order of connection, and the encoder 40-4 is on the lowermost-level in the order of connection. The encoders 40-1 to 40-3 each forward a command received from an upper-level device (such as the controller 10 and the encoders 40-1 and 40-2) to a lower-level device (such as the encoders 40-2 to 40-4). The encoders 40-1 to 40-4 each send a result obtained by executing the command to the upper-level device (such as the controller 10 and the encoders 40-1 to 40-3). The encoders 40-1 to 40-3 each forward the result received from the lower-level device (such as the encoders 40-2 to 40-4) to the upper-level device (such as the controller 10 and the encoders 40-1 to 40-3). A possible application is that the encoders 40-1 to 40-4 are connected to each other in a daisy-chain configuration and make serial communication with the controller 10. This configuration saves wiring space inside the robot 3 while ensuring safety by implementing data duplication as in the above-described embodiment. These advantageous effects are especially true of robot applications. In FIG. 6, other wirings and auxiliary equipment are omitted.

The robot system 2 may implement at least one of the first function and the second function of the above-described embodiment. Specifically, the robot system 2 may implement the first function alone; that is, without duplicating the processor 41 and the communication controller 42, data reliability approximately equivalent to data reliability ensured by implementing data duplication is ensured. Alternatively, the robot system 2 may implement the second function alone; that is, by changing the sending data between the normal data and the safety data, the first addition information, which takes longer than the sending period $T_S$ to generate, is sent to the controller 10.

The controller 10 may be separate from the motor controller 20 (servo controller or servo amplifier) or may incorporate the motor controller 20. Another possible embodiment is that the encoders 40 have one or a plurality of motor controllers 20 to communicate with, and the one or the plurality of motor controllers 20 is (are) controlled by an upper-level device. That is, the controller 10 may encompass both the motor controller 20 and the upper-level device that controls the motor controller 20, or the motor controller 20 and the upper-level device that controls the motor controller 20 may be separate from each other. When the motor controller 20 and the upper-level device that controls the motor controller 20 are separate from each other, the motor controller 20 may correspond to the controller 10, or the upper-level device that controls the motor controller 20 may correspond to the controller 10.

While the optical disc 44A and the magnetic disc 44B of the encoder 40 have been described as respectively corresponding to the first rotator and the second rotator recited in the appended claims, any other rotators are possible insofar as the rotators are mountable to the rotation shaft of the motor 30. Additionally, the rotators may not necessarily be discs. Thus, the first rotator and the second rotator may be other than discs. While the optical sensor 45A and the magnetic sensor 45B of the encoder 40 have been described as respectively corresponding to the first detector and the second detector recited in the appended claims, any other detectors other than sensors are possible insofar as the detectors are capable of detecting the rotation position within one rotation and the rotation count. While the sender 450 of the encoder 40 has been described as corresponding to the sender recited in the appended claims, another possible example of the sender is a wireless communication interface applicable if the encoder 40 is capable of making wireless communication.

While the receivers 111A and 111B of the controller 10 have been described as corresponding to the data receiver recited in the appended claims, another possible example of the data receiver is a wireless communication interface applicable if the controller 10 is capable of making wireless communication. The comparers 144A and 144B may check the operation of the encoder 40 of the motor 30 in any other method than the method described in the above-described embodiment insofar as the comparers 144A and 144B check the operation of the encoder 40 based on the rotation count obtained by the rotation count obtainer and the rotation count obtained by the data obtainer. For example, the comparers 144A and 144B may check the operation of the encoder 40 by determining whether the difference between the two rotation counts is within a reference. Alternatively, the comparers 144A and 144B may check the operation of the encoder 40 by substituting the two rotation counts into a given mathematical formula to obtain a value and determining whether the obtained value is within a reference range.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. An encoder comprising:
   a first disc and a second disc mounted on a rotation shaft of a motor;
   a first detector configured to detect a rotation position of the first disc within one rotation of the first disc;
   a second detector configured to detect that the second disc has made one rotation;
   a rotation count detector configured to count a rotation count of the second disc based on an output from the second detector;
   a sender configured to send sending data comprising the rotation position and the rotation count;
   a first error detection sign adder configured to add a first error detection sign to the rotation count; and
   a second error detection sign adder configured to add a second error detection sign to the sending data.

2. The encoder according to claim 1,
   wherein the first error detection sign adder is configured to add a first CRC value to the rotation count, and
   wherein the second error detection sign adder is configured to add a second CRC value to the sending data.

3. The encoder according to claim 2,
   wherein the first disc comprises an optical disc, and
   wherein the second disc comprises a magnetic disc.

4. The encoder according to claim 2, further comprising a test counter generator configured to generate a test counter that indicates a different value every time the sending data is sent,
   wherein the first error detection sign adder is configured to add the first error detection sign to the rotation count and the test counter.

5. The encoder according to claim 4,
   wherein the first disc comprises an optical disc, and
   wherein the second disc comprises a magnetic disc.

6. The encoder according to claim 1,
   wherein the first disc comprises an optical disc, and
   wherein the second disc comprises a magnetic disc.

7. A controller comprising:
   a receiver configured to receive sending data from an encoder of a motor, the sending data comprising: a rotation position of a rotation shaft of the motor within one rotation of the rotation shaft; and a first rotation count of the rotation shaft;
   a first rotation count obtainer configured to obtain a second rotation count of the rotation shaft based on a change in the rotation position of the rotation shaft within the one rotation of the rotation shaft;
   a second rotation count obtainer configured to obtain the first rotation count included in the sending data;
   a comparer configured to compare the second rotation count obtained by the first rotation count obtainer with the first rotation count obtained by the second rotation count obtainer;
   a first error detector configured to check a first error detection sign added to the rotation count included in the sending data; and
   a second error detector configured to check a second error detection sign added to the sending data.

8. The controller according to claim 7, further comprising a test counter determiner configured to determine whether a value indicated by a test counter included in the sending data is correct.

9. The controller according to claim 7,
   wherein the first error detector is configured to check a first CRC value added to the rotation count included in the sending data, and
   wherein the second error detector is configured to check a second CRC value added to the sending data.

10. The controller according to claim 9, further comprising a test counter determiner configured to determine whether a value indicated by a test counter included in the sending data is correct.

11. A method for processing data, the method comprising:
    detecting, using a first sensor, a rotation position of a first disc within one rotation of the first disc, the first disc being mounted on a rotation shaft of a motor;
    detecting, using a second sensor, that a second disc mounted on the rotation shaft has made one rotation;
    counting a rotation count of the second disc based on an output from the second detector;
    sending data comprising the rotation position and the rotation count;
    adding, using a first error detection sign adder, a first error detection sign to the rotation count; and
    adding, using a second error detection sign adder, a second error detection sign to the sending data.

* * * * *